Patented Jan. 20, 1948

2,434,833

UNITED STATES PATENT OFFICE 2,434,833

PROCESS FOR CONDENSATION OF HYDROCARBONS BY CONTACT WITH CONCENTRATED SULFURIC ACID IN SILICA GEL

Frank G. Ciapetta, Drexel Hill, Pa., assignor to The Atlantic Refining Company, Philadelphia, Pa., a corporation of Pennsylvania No Drawing. Original application July 9, 1942, Serial No. 450,338. Divided and this application May 27, 1944, Serial No. 537,734

7 Claims. (Cl. 260—671)

The present invention relates to an improved catalyst composition and its use in catalyzing reactions between organic compounds. More particularly this invention relates to an improved sulfuric acid catalyst and its use in catalyzing reactions between organic compounds which are susceptible of reaction in the presence of concentrated sulfuric acid.

This application is a division of my co-pending application, Serial No. 450,338, filed July 9, 1942, now U. S. Patent 2,430,803, dated November 11, 1947.

In accordance with this invention, there is provided a dry, granular catalyst comprising silica gel impregnated with sulfur trioxide in an amount sufficient only to unite with the water content of the gel to form concentrated sulfuric acid, i. e., substantially 100 per cent $H_2SO_4$, in the pores of the gel. Such acid is very tightly held within the pores of the gel by adsorption, absorption, or the formation of a complex compound between the acid and the gel, such compound being of unknown composition.

The improved silica gel-sulfuric acid catalyst of this invention is adapted for use in catalyzing a variety of chemical reactions, and particularly the polymerization of olefinic compounds, the alkylation of isoparaffins with olefins, the alkylation of aromatic hydrocarbons, naphthenic hydrocarbons or phenolic compounds with olefins or alcohols, the dehydration of alcohols to form ethers or olefins, and the hydration of olefins with water to form alcohols. These reactions are typical examples in which the catalyst of the present invention may be advantageously employed, and are not to be construed as limiting the scope of the invention.

In the preparation of the catalyst, a granular silica gel having a water content within the range of 3 per cent to 15 per cent by weight is placed in a suitable vessel and a stream of vaporous $SO_3$ is passed into and through the silica gel. The silica gel may be of any desired mesh size, for example, 4-8, 10-30, 20-80, 30-60, or fine mesh such as 100-300. The $SO_3$ may be produced by heating fuming sulfuric acid to a temperature sufficiently high to drive off the $SO_3$ as vapors, or by vaporizing solid or liquid $SO_3$. The $SO_3$, upon reaction with the water contained in the silica gel, forms concentrated sulfuric acid in the pores of the gel and generates considerable heat which may be utilized in the removal of any excess $SO_3$ from the gel. The concentrated sulfuric acid in the gel, i. e., substantially 100 per cent $H_2SO_4$, may contain dissolved $SO_3$, and this may be removed by flushing the gel with a dry inert gas, such as nitrogen, hydrogen, air or the like at a suitable temperature, for example, 212° F. or higher. The gel, after removal of excess $SO_3$, may be cooled and is then ready for use. Depending upon the initial water content of the gel, i. e., 3 per cent to 15 per cent by weight, the catalyst may contain from 15.0 per cent to 46 per cent by weight of concentrated $H_2SO_4$. The catalyst is a dry, granular material which is readily handled and which can be stored without difficulty for considerable periods, provided that precautions are taken to prevent contact with moisture.

The catalyst may be used in promoting reaction between organic compounds either in the liquid phase or in the vapor phase, depending upon the reactivity of the compounds and the composition of the products which it is desired to produce. The dry silica gel-$H_2SO_4$ catalyst possesses a number of advantages over the conventional liquid $H_2SO_4$ catalysts, including ease of handling, a relatively higher catalytic efficiency due to increased contact surface, and the fact that the chemical reactions can be effected simply by passing the reactants in the liquid or vapor phase through a bed of the catalyst, thereby avoiding the necessity of agitation invariably required in the use of liquid $H_2SO_4$ catalysts.

The present invention may be further illustrated by the following examples, which, however, are not to be construed as limiting the scope thereof.

A silica gel-$H_2SO_4$ catalyst was prepared by heating 30 per cent fuming sulfuric acid and passing the resulting vaporous $SO_3$ through a bed of commercial 4-8 mesh silica gel containing 5.7 per cent by weight of water. The passage of the $SO_3$ was continued until $SO_3$ vapors were no longer absorbed, thus indicating that the gel was thoroughly impregnated or saturated with $SO_3$. The reaction of the $SO_3$ with the water content of the gel caused a considerable rise in temperature of the gel. The gel was then brought to a temperature of about 212° F. and a stream of dry nitrogen was passed through the gel at this temperature in order to flush out any excess $SO_3$. The dry gel containing the firmly held concentrated $H_2SO_4$ was then cooled, and the gel was found to contain about 23.0 per cent by weight of concentrated $H_2SO_4$ (100 per cent). The gel, as above prepared, was employed as a catalyst in the following reactions.

1. Isobutylene was passed through 90 volumes of the silica gel-$H_2SO_4$ catalyst at a rate of 235 volumes of isobutylene per minute, for a period of 6.2 hours at a temperature of 70° F. and at atmospheric pressure. There was obtained 253 volumes of liquid hydrocarbon product (isobutylene polymers) having an A. P. I. gravity of 56.6°, representing a weight per cent yield of 94.0 based upon the isobutylene charged. An assay distillation of the liquid product gave 0.8 volume per cent up to 203° F., 20.5 volume per cent between 204° F. and 302° F. (di-isobutylene fraction), 58.7 volume per cent between 303° F. and 365° F. (tri-isobutylene fraction), 16.4 volume per cent bottoms (higher polymers and tar), and 3.6 volumes per cent loss (decomposition and handling).

2. Isobutylene, in the liquid phase, was passed through 80 volumes of the silica gel-$H_2SO_4$ catalyst at a rate of 1 volume of liquid isobutylene per minute, for a period of 5 hours at a temperature of 67° F., and at a superatmospheric pressure of 30 pounds per square inch. There was obtained 305 volumes of liquid hydrocarbon product (isobutylene polymers) having an A. P. I. gravity of 60.8°, representing a weight per cent yield of 97.8 based upon the isobutylene charged. An assay distillation of the liquid product gave 1.0 volume per cent up to 203° F., 35.6 volume per cent between 204° F. and 302° F. (di-isobutylene fraction), 46.0 volume per cent between 303° F. and 365° F. (tri-isobutylene fraction), 6.8 volume per cent bottoms (higher polymers and tar), and 10.6 volume per cent loss (decomposition and handling). It will be noted that in this run, the pressure employed appeared to cause an increased production of di-isobutylene, and a decreased production of tri-isobutylene and higher polymers, as compared with the results in the first example.

3. A liquefied mixture comprising 266 volumes of isobutane and 117 volumes of isobutylene was passed through 60 volumes of silica gel-$H_2SO_4$ catalyst under a pressure of 50 pounds per square inch at a temperature of 80° F., the contact time being 39 minutes. The liquid product recovered from the reaction amounted to 90 volumes at atmospheric pressure and had an A. P. I. gravity of 66.4°. An assay distillation of the product gave 3.4 volume per cent up to 203° F., 10.2 volume per cent between 204° F. and 302° F. (iso-octane fraction, A. P. I. gravity 67.8°, bromine number 16.9), 48.9 volume per cent between 303° F. and 365° F. (tri-isobutylene fraction), 11.4 volume per cent bottoms (higher polymers and tar), and 26.1 volume per cent loss (decomposition and handling).

4. A mixture comprising 113 parts by weight of benzene and 43 parts by weight of propylene was passed through 80 volumes of silica gel-$H_2SO_4$ catalyst at atmospheric pressure and at a temperature of 70° F., the reaction time being 2 hours. The liquid product recovered from the reaction amounted to 131 parts by weight and had an A. P. I. gravity of 31.1°. An assay distillation of the product gave 47.5 volume per cent up to 212° F. (mostly benzene), 25.0 volume per cent between 213° F. and 320° F. (mono-isopropyl benzene fraction), 25.0 volume per cent bottoms (di-isopropyl benzene fraction), and 2.5 volume per cent loss (decomposition and handling).

The above examples are merely illustrative of several types of reactions which may be promoted with the silica gel-$H_2SO_4$ catalyst of my invention. The polymerization of unsaturates may be carried out at temperatures between 0° F. and 450° F., in the liquid phase or in the vapor phase, using pressures of from atmospheric up to about 1000 pounds per square inch. For example, isobutylene, per se, may be polymerized, or mixtures of different olefins such as propylene and butylene may be co-polymerized. The alkylation of isoparaffins or aromatics with olefins may be effected at temperatures between 0° F. and 150° F. at atmospheric or superatmospheric pressure.

My catalyst may also be used to promote other reactions, including the alkylation of aromatic hydrocarbons, naphthenic hydrocarbons, and phenolic compounds with olefins or alcohols such as methyl alcohol, ethyl alcohol, the propyl alcohols, the butyl alcohols, the amyl alcohols, and the like. Or olefins such as ethylene, propylene or butylene may be hydrated to the corresponding alcohols in the presence of my silica gel-$H_2SO_4$ catalyst. On the other hand, alcohols such as ethyl alcohol, propyl alcohol, butyl alcohol and the like may be dehydrated under the proper conditions in the presence of my catalyst to give either olefins or ethers. For example, ethyl alcohol may be dehydrated by passage over my catalyst at temperatures of 120° C. to 130° C. to form diethyl ether, or the dehydration may be effected at temperatures of 170° C. to 180° C. to form ethylene. The formation of esters by the reaction of alcohols with fatty acids, naphthenic acids, and the like may be promoted by the presence of my catalyst composition. These, and many other reactions which are catalyzed by the presence of concentrated sulfuric acid, are included within the scope of my invention.

In utilizing the silica gel-$H_2SO_4$ catalyst for promoting chemical reactions, the catalytic efficiency of the composition necessarily decreases with extended use, due to dilution of the sulfuric acid held firmly in the pores of the gel and the accumulation of tarry or other foreign matter upon the surfaces of the gel particles. At such time as the catalytic efficiency has decreased to an extent which makes further use impractical, the catalyst may be regenerated by washing with water, or solvents, or by steaming, and then re-impregnating the gel with $SO_3$. In this manner the gel may be re-used many times, only at the expense of cleaning and re-impregnating with $SO_3$. In those cases where the catalyst becomes inefficient primarily as a result of tarry accumulations, the catalyst may be regenerated simply by washing with a solvent for the tarry material, no re-impregnation with $SO_3$ being necessary.

I claim:

1. The method of effecting reaction between organic compounds susceptible of reaction in the presence of a concentrated sulfuric acid catalyst, which comprises bringing said organic compounds into intimate contact with silica gel having an initial water content of 3% to 15% by weight impregnated with sulfur trioxide in quantity sufficient to unite with the water content of said gel to form 100% sulfuric acid in the pores of said gel, and removing from contact with said impregnated gel, the reaction product of said organic compounds.

2. The method of polymerizing unsaturated hydrocarbons to produce hydrocarbons of higher molecular weight, which comprises bringing said unsaturated hydrocarbons into intimate contact with silica gel having an initial water content of 3% to 15% by weight impregnated with sulfur trioxide in quantity sufficient to unite with the water content of said gel to form 100% sulfuric acid in the pores of said gel, and removing from contact with said impregnated gel, the resulting hydrocarbon polymers.

3. The method of alkylating an isoparaffin with an olefin, which comprises bringing a mixture of said isoparaffin and said olefin into intimate contact with silica gel having an initial water content of 3% to 15% by weight impregnated with sulfur trioxide in quantity sufficient to unite with the water content of said gel to form 100% sulfuric acid in the pores of said gel, and removing from contact with said impregnated gel, the resulting alkylated isoparaffin.

4. The method of alkylating an aromatic hydrocarbon with an olefin, which comprises bringing a mixture of said aromatic hydrocarbon and said olefin into intimate contact with silica gel having an initial water content of 3% to 15% by weight impregnated with sulfur trioxide in quantity sufficient to unite with the water content of said gel to form 100% sulfuric acid in the pores of said gel, and removing from contact with said impregnated gel, the resulting alkylated aromatic hydrocarbon.

5. The method of effecting reaction between organic compounds susceptible of reaction in the presence of a concentrated sulfuric acid catalyst, which comprises bringing said organic compounds into intimate contact with a catalyst prepared by passing sulfur trioxide through silica gel having an initial water content of 3% to 15% by weight to unite with the water content of the gel to form concentrated sulfuric acid in the pores of said gel, and removing from said gel any excess of sulfur trioxide, whereby the acid concentration in the gel is substantially 100%.

6. The method of effecting reaction between organic compounds susceptible of reaction in the presence of a concentrated sulfuric acid catalyst, which comprises bringing said organic compounds into intimate contact with a catalyst prepared by passing sulfur trioxide through silica gel having an initial water content of 3% to 15% by weight to unite with the water content of the gel to form concentrated sulfuric acid in the pores of said gel, heating said gel and passing an inert gas through said gel to remove therefrom any excess of sulfur trioxide, whereby the acid concentration in the gel is substantially 100%.

7. A method of polymerizing isobutylene, which comprises bringing isobutylene into intimate contact, at a temperature of about 70° F., with silica gel having an initial water content of 3% to 15% by weight impregnated with sulfur trioxide in quantity sufficient to unite with the water content of said gel to form 100% sulfuric acid in the pores of said gel, and removing from contact with said impregnated gel, the resulting isobutylene polymers.

FRANK G. CIAPETTA.

REFERENCES CITED

The following references are of record in the file of this patent:

UNITED STATES PATENTS

| Number | Name | Date |
| --- | --- | --- |
| 1,933,091 | Bertsch | Oct. 31, 1933 |
| 2,131,196 | Schneider | Sept. 27, 1938 |
| 2,181,640 | Deanesly et al. | Nov. 28, 1939 |
| 2,258,368 | Stevens et al. | Oct. 7, 1941 |
| 2,293,353 | Moravec et al. | Aug. 18, 1942 |
| 2,384,311 | Kearby | Sept. 4, 1942 |